United States Patent
Hadjifotiou

[11] Patent Number: 5,572,351
[45] Date of Patent: Nov. 5, 1996

[54] OPTICAL COMMUNICATIONS SYSTEMS

[75] Inventor: Anagnostis Hadjifotiou, Harlow, Great Britain

[73] Assignee: Northern Telecom Limited, Montreal, Canada

[21] Appl. No.: 492,496

[22] Filed: Jun. 20, 1995

Related U.S. Application Data

[63] Continuation of Ser. No. 947,271, Sep. 18, 1992, abandoned.

[30] Foreign Application Priority Data

Sep. 26, 1991 [GB] United Kingdom ............... 9120495

[51] Int. Cl.$^6$ .................. H04B 10/00; H04B 10/12; H04B 10/02; H04B 10/16
[52] U.S. Cl. ................. 359/161; 359/175; 359/173; 359/176; 359/179
[58] Field of Search .................. 359/189, 190, 359/191, 192, 193, 194, 195, 154, 156, 174, 175, 161, 176, 179

[56] References Cited

U.S. PATENT DOCUMENTS

| | | | |
|---|---|---|---|
| 4,850,048 | 7/1989 | Mohr | 359/195 |
| 4,947,459 | 8/1990 | Nelson et al. | 359/161 |
| 4,972,515 | 11/1990 | Shibutani | 455/619 |
| 5,023,946 | 6/1991 | Yamazaki et al. | 455/619 |
| 5,027,435 | 6/1991 | Chraplyvy et al. | 359/173 |
| 5,097,221 | 3/1992 | Miller | 455/266 |
| 5,142,402 | 8/1992 | Tsushima et al. | 359/192 |
| 5,228,043 | 7/1993 | Naito et al. | 372/32 |
| 5,230,098 | 7/1993 | Seki | 455/266 |
| 5,237,287 | 8/1993 | Bar-David | 329/308 |
| 5,247,382 | 9/1993 | Suzuki | 359/156 |
| 5,249,202 | 9/1993 | Hillum et al. | 455/71 |
| 5,260,975 | 11/1993 | Saito | 375/81 |

*Primary Examiner*—Hezron E. Williams
*Assistant Examiner*—Richard A. Moller
*Attorney, Agent, or Firm*—Lee, Mann, Smith, McWilliams, Sweeney & Ohlson

[57] ABSTRACT

In an optical communications system including a transmitter (laser 1) and a receiver, with an optical amplifier (3) and an optical filter (4) therebetween, the position of the passband of the optical filter (4) is adjusted automatically in dependence on a received pilot carrier signal frequency transmitted with the data. This facilitates initial selection of transmitter laser (1) and avoids the need for transmitter laser frequency stabilisation. The optical filter acquires and tracks the optical carrier used by the transmitter.

7 Claims, 1 Drawing Sheet

OPTICAL COMMUNICATIONS SYSTEMS

This application is a continuation of application Ser. No. 07/947,271, filed Sep. 18, 1992, now abandoned.

BACKGROUND TO THE INVENTION

This invention relates to optical communications systems and in particular to optical communications systems including optical amplifiers.

Optical communications systems in which data is transmitted between transmitter and receiver terminals over optical links, in particular optical fibre links, may employ optical amplifiers comprised by semiconductor devices or erbium doped silica fibres, for example, in the optical links. The use of an optical amplifier enhances the sensitivity of the optical receiver at the receiver terminal. The degree of enhancement depends on the amount of optical filtering used between the optical amplifier (also known as an optical pre-amplifier) and the receiver. In principle, the narrower the filter, the higher the sensitivity enhancement. However, the use of narrow band optical filters has two disadvantages. The first is the requirements it imposes on the selection of the transmitter laser wavelength and the second is the requirement it imposes on the stability of the transmitted wavelength with time over the lifetime of the system.

The present invention aims to remove both of these restrictions.

SUMMARY OF THE INVENTION

According to the present invention there is provided an optical communications system comprising an optical transmitter and an optical receiver and including an optical amplifier and an optical filter arranged in series therebetween, data being transmitted by the transmitter to the receiver, and including means whereby an optical pilot carrier signal is added to the data to be transmitted and means whereby the position of the passband of the optical filter is adjusted in dependence on the received optical pilot carrier signal frequency such that the passband tracks variations in the transmitted frequency.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
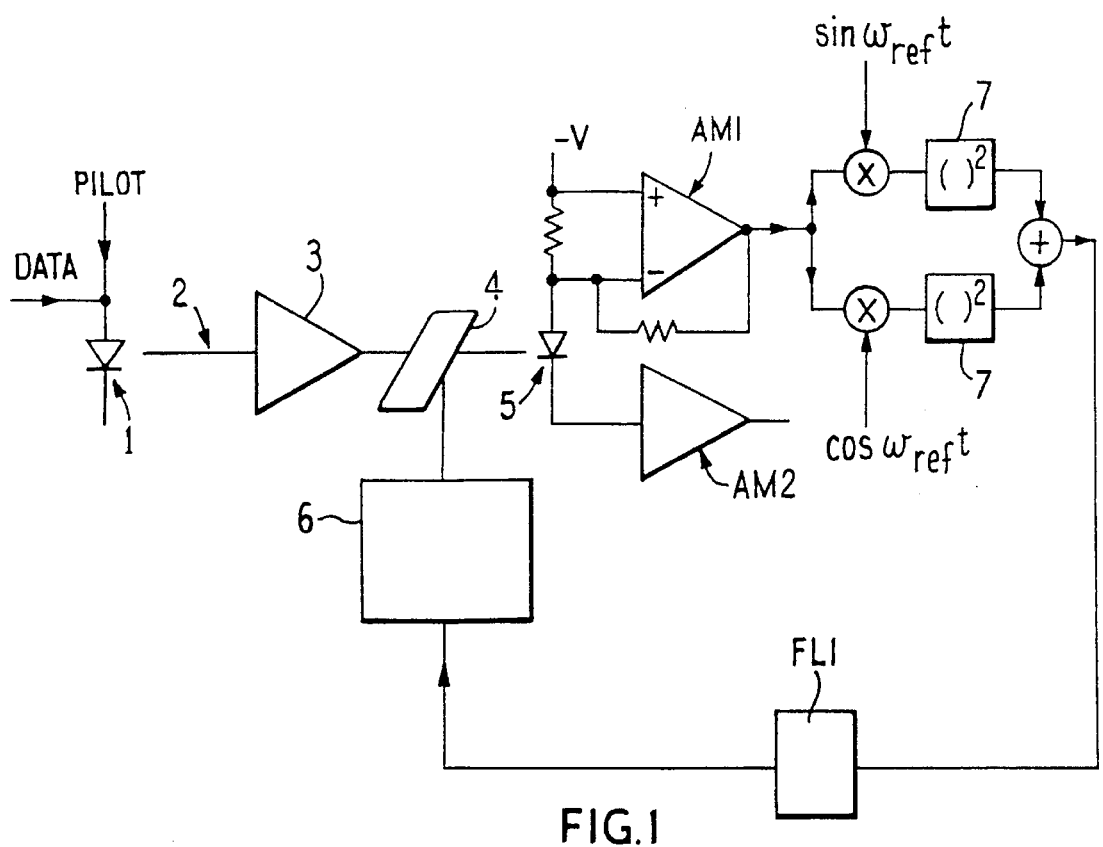
FIG. 1 illustrates, schematically, a basic system which employs the present invention.

The basic optical communications system illustrated in FIG. 1 comprises an optical transmitter (laser 1), an optical link 2 including an optical pre amplifier 3 and an optical filter 4 in series, and a receiver including a photodetector 5. In order to overcome the disadvantages referred to above, an adaptive optical subsystem is provided which ensures that the optical filter 4 acquires and tracks an optical pilot carrier used by the optical transmitter. The construction and principle of operation of this subsystem will now be described.

The transmitter adds a pilot carrier or signal (pilot) to the data to be transmitted. The frequency of the pilot carrier is chosen to be below or above the frequency band occupied by the data. The data and pilot signal are transmitted between the transmitter and the receiver and may be amplified by amplifiers (not shown) therebetween prior to reaching optical preamplifier 3. After passing through the optical filter 4, the pilot signal is detected differentially by the receiver including photodetector 5 and amplified by amplifier AM1. The received data are amplified by amplifier AM2, which is the low noise amplifier of the optical receiver. After AM1 the pilot signal is either filtered and rectified or, and as shown, it is mixed with a local reference frequency $w_{ref}$ to be detected synchronously by the square law detectors 7. The advantage of synchronous detection over non-synchronous detection is the higher sensitivity of the former. After either of these operations the pilot signal is filtered by filter FL1 and applied to an optical filter controller 6 which can either be comprised by a computer or dedicated electronics. Filter FL1 filters out the high frequency signal components generated by the detection. (synchronous or non-synchronous). The optical filter 4 is a fixed bandwidth optical filter. For example, a multilayer interference filter. With such a filter the position of the passband can be adjusted by adjusting the angle of incidence of the incoming radiation. The optical filter controller 6 uses the output of filter FL1 to generate a signal which changes the frequency (wavelength) of the maximum response of the optical filter 4 so that it coincides with that of the transmitted optical carrier signal In this way the position of the passband of the optical filter 4 always coincides with the transmitted optical signal and the sensitivity of the receiver is maximised.

This apparatus can be used with an intensity modulated format or with any of the coherent modulation formats, such as frequency shift keying, phase shift keying or amplitude shift keying. Further it can be used with an optical preamplifier, as described above, and/or with optical line amplifiers (FIG. 2).

A more detailed description of some aspects of the invention will now be given with reference to FIG. 2, which relates to an optical line amplifier application. Input light is applied to optical amplifier 13 which is followed by optical filter 14, the optical output of which is transmitted on towards a distant receiver. The light required for the filter control is tapped off by means of fibre coupler 15 as illustrated but this is not the only possibility. The filter control arrangement of FIG. 2 is the same as illustrated in FIG. 1 and comprises a photodetector 16, detection means including square law detector 7 at the output of amplifier 18, a filter 19 and a computer or dedicated electronics comprising an optical filter controller 20.

Figure 2:
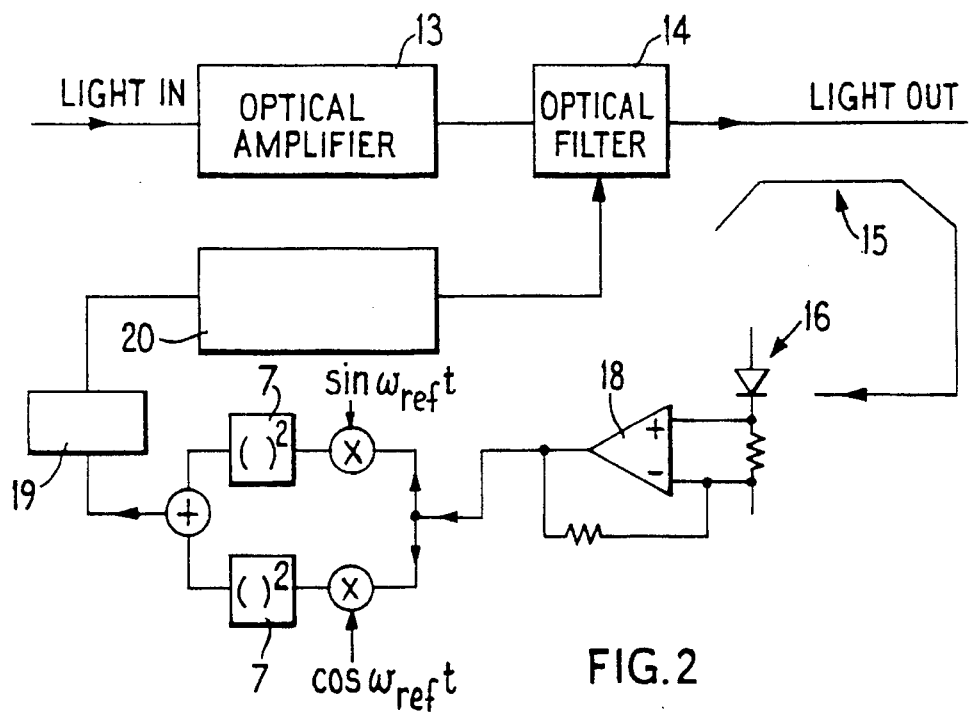
FIG. 2 illustrates, schematically, part of another system which employs the present invention.

Two phases of operation of the arrangements shown in FIGS. 1 and 2 can be distinguished; carrier acquisition and carrier tracking. These will now be described with reference to FIG. 2

In the carrier acquisition phase, the peak of the passband response of the optical filter 14 does not coincide with the transmitted wavelength and the input to amplifier 18 is zero. Under these conditions the optical filter controller 20 initiates a search in the sense that the position of the passband of optical filter 14 is changed under control and the output of filter 19 continuously monitored. When the position of the passband of the optical filter 14 coincides with the transmitted carrier signal, the output from filter 19 increases and that signals to the controller 20 that the optical carrier is within the then passband of the optical filter 14. At this stage the acquisition phase is completed, searching stops and tracking commences. During the tracking phase any small changes in the carrier wavelength (frequency) are compensated by the controller 20 which, using the output of filter 19, commands the optical filter 14 to follow the changes in the carrier (pilot) wavelength.

In summary, a pilot carrier is added to the data and both are transmitted over an optical path. At the receiver after an optical preamplifier, or simply after a repeater amplifier, the pilot is detected and a control system driven by the detected pilot ensures that the position of the passband of an optical filter, between the preamplifier (or repeater amplifier) and an optical receiver, coincides with the transmitted optical carrier signal.

The use of a tracking filter arrangement as described above makes the selection of lasers for optical systems using optical amplifiers very easy and furthermore the transmitter does not require frequency stabilisation.

I claim:

1. An optical communications system comprising an optical transmitter arranged to transmit optical data signals at an optical data signal frequency, an optical receiver an optical transmission path between the transmitter and receiver, and an optical amplifier and an optical bandpass filter disposed in the optical path between the transmitter and receiver said filter having a pass band whose width is substantially constant but whose centre frequency is adjustable via frequency control means associated with the filter, wherein the transmitter includes means for transmitting together with the data signals an optical pilot signal having a frequency different from said optical data frequency but sufficiently close to said data frequency that both frequencies can be accommodated within the band width of the bandpass filter, wherein said receiver includes detection means for detecting said pilot signal, there being feedback means provided between said detection means and said filter control means, wherein the optical filter control means incorporates acquisition means for adjusting the centre frequency of the filter pass band so as to include the frequency of the pilot signal within the pass band so as to provide detection of the pilot signal by the detection means and initial acquisition of the pilot signal, and wherein, subsequent to said initial acquisition of the pilot signal, the filter control means responds to signals from the detection means via the-feedback means to provide adjustment of the centre frequency of the optical filter in dependence on the received optical pilot carrier signal frequency such that the centre frequency of the al band.

2. An optical communications system comprising an optical transmitter arranged to transmit optical data signals at an optical data signal frequency; an optical receiver, an optical transmission path between the transmitter and receiver, and an optical amplifier and an optical bandpass filter disposed in the optical path between the transmitter and receiver, said filter having a pass band whose width is substantially constant but whose centre frequency is adjustable via frequency control means associated with the filter, wherein the transmitter includes means for transmitting together with the data signals an optical pilot signal having a frequency different from said optical data frequency but sufficiently close to said data frequency that both frequencies can be accommodated within the band width of the bandpass filter, the system including a first receiver amplifier for amplifying received data signals, a second receiver amplifier amplifying the received optical pilot carrier signal, synchronous detection means for detecting the amplified optical pilot carrier signal, and feedback means provided between the synchronous detection means and the control means, wherein the optical filter control means incorporates acquisition means for adjusting the centre frequency of the filter pass band so as to include the frequency of the pilot signal within the pass band so as to provide detection of the pilot signal by the detection means and initial acquisition of the pilot signal, and wherein, subsequent to said initial acquisition of the pilot signal, the filter control means responds to signals from the detection means via the feedback means to provide adjustment of the centre frequency of the optical filter in dependence on the received optical pilot carrier signal frequency such that the centre frequency of the filter pass band is tracked to match variations in the transmitted pilot signal frequency so as to maintain the data signal frequency within said pass band.

3. A system as claimed in claim 2 wherein the optical amplifier is a preamplifier of the receiver and including means whereby the amplified and detected pilot carrier signal is filtered to remove high frequency signal components generated by the synchronous detection.

4. A system as claimed in claim 2 wherein the optical amplifier is an optical line repeater amplifier and including means whereby the amplified and detected pilot carrier signal is filtered to remove high frequency signal components generated by the synchronous detection.

5. A system as claimed in claim 2, wherein the optical amplifier is a semiconductor device.

6. A system as claimed in claim 1, wherein the optical amplifier is an erbium doped silica fibre.

7. A system as claimed in claim 2, wherein the optical filter is a multilayer interference filter.

* * * * *